(12) United States Patent
Lee

(10) Patent No.: US 10,704,390 B2
(45) Date of Patent: Jul. 7, 2020

(54) HOUSING WHEEL ENGINE WITH METHOD OF EPITROCHOID

(71) Applicant: Lance Yan Lee, Winchester, MA (US)

(72) Inventor: Lance Yan Lee, Winchester, MA (US)

( * ) Notice: Subject to any disclaimer, the term of this patent is extended or adjusted under 35 U.S.C. 154(b) by 561 days.

(21) Appl. No.: 15/173,834

(22) Filed: Jun. 6, 2016

(65) Prior Publication Data

US 2017/0350314 A1 Dec. 7, 2017

(51) Int. Cl.
*F01B 5/00* (2006.01)
*F16H 1/28* (2006.01)

(52) U.S. Cl.
CPC . *F01B 5/00* (2013.01); *F16H 1/28* (2013.01)

(58) Field of Classification Search
CPC .......... F02B 53/04; F02B 53/12; F02B 55/02; F16H 1/28; F16H 21/365; F16H 2025/2087; F16H 2057/087; F16H 2718/00; F16H 2720/04

USPC ....... 123/200, 202, 210, 228, 229, 241, 245; 418/34–38, 61.1, 191, 196, 198, 199, 277; 475/198, 269, 275, 331; 74/7 E
See application file for complete search history.

(56) References Cited

U.S. PATENT DOCUMENTS

| | | | |
|---|---|---|---|
| 2011/0212808 A1* | 9/2011 | Pabst | C21D 7/06 475/348 |
| 2016/0319910 A1* | 11/2016 | Sevagen | F16H 1/2863 |
| 2017/0016525 A1* | 1/2017 | Shaw | F16H 57/0006 |
| 2017/0152937 A1* | 6/2017 | Schlack | E02F 9/202 |

* cited by examiner

*Primary Examiner* — William V Gilbert

(57) ABSTRACT

Disclosed herein is a revised version of housing wheel engine with method of hypotrochoid that patented U.S. Pat. No. 7,730,869. It keeps the main functions and also provides not only cases $R_r \geq 3$ but also cases $R_r 2$ and $R_r 1$, which means it has been able to develop engines as well as four pistons and two pistons, which the previous version cannot do.

1 Claim, 9 Drawing Sheets

HOUSING WHEEL ENGINE WITH METHOD OF EPITROCHOID

BACKGROUND OF THE INVENTION

1. Field of the Invention

This invention relates to a four-stroke cycle internal combustion Housing Wheel Engine, it has been issued Jun. 8, 2010, U.S. Pat. No. 7,730,869.

2. Discussion of the Technical Problems of U.S. Pat. No. 7,730,869

2.1 the Kinematics Feature of the Hypotrochoid and its Defects:

A hypotrochoid system formed by a fixed-circle R and a pair sets of rolling circles r (here R and r represent the circles themselves and also their radius), and each of the r has an eccentric point P with an offset d. See FIG. 1a.

In order to build a machine with hypotrochoid system, the prerequisites are: Take 2 sets, and each set has a number $R_r$ of the rolling circles r. (here $R_r$ is a trochoid radius ratio and it must be an integer and the value of the $R_r$ is $R_r = R/r$), put them inside of the fixed circle R evenly at a certain polar angle $\alpha_i$, and set each of the eccentric points P at a certain polar angle $\theta_i$. See FIG. 1a.

The expressions of prerequisites of above are:

$R_r = R/r$ and $R_r \in \{3, 4, \ldots\}$;            1)

$\alpha_i = (i-1)180°/R_r$, and $i \in \{1, 2, \ldots 2*R_r\}$;      2)

$\theta_i = \alpha_i + i*180°$, and $i \in \{1, 2, \ldots 2*R_r\}$.      3)

For simplicity, using the trochoid radius ratio $R_r$ as a description of equation of $R_r = R/r$ and also to describe the scale of the machine. For example, $R_r 3$ machine means it is a machine that has $R_r = R/r = 3$, also means it is a six pistons engine.

With reference to FIG. 1a, it can be seen: Based on above essential setup, any two of the neighborhoods of the eccentric point P will locate at opposite sides of a circle c. When all of the rolling circles r rolls inside of the fixed circle R with the same direction and velocity, it will make any two of neighborhoods of the P move either approaching or apart each other. It demonstrates that this hypotrochoid system has such a kinematics feature of a compressor mechanism.

The kinematics feature of hypotrochoid system has been adopted in the invention of Housing Wheel Engine (U.S. Pat. No. 7,730,869 dated Jun. 8, 2010).

FIG. 1b shows how to form a housing wheel engine based on such hypotrochoid system.

When six (here FIG. 1b shows the example of $R_r 3$ engine) rolling gears $G_r$ roll inside of a fixed annular internal gear $G_b$, an eccentric pin $G_p$ (which joined inside of a spoke's slot $S_s$), drives a pair of spoke $S_p 1$, $S_p 2$ and a pair of pistons $P_s 1$, $P_s 2$ (which fixed on the top of the spokes), doing (1) reciprocating swing with respect to a center of rolling gear $O_r$ and (2) rotation moving with respect to a center of the fixed annular internal gear $O_b$. These two kinds of movements represent respectively of (1) compressing/expanding motions between any two of the neighborhoods of pistons $P_s$, and (2) four-stroke circulation around the $O_b$.

Unfortunately the Housing Wheel Engine with hypotrochoid provides only $R_r \geq 3$ cases, which means it cannot be able to develop as an engine that has less than 6 pistons. This is because of: (1) hypotrochoid doesn't even have $R_r 1$ case, and (2) in the case of $R_r 2$, the sizes of the rolling gears extend to the center of the fixed annular internal gear $O_b$ so that occupied the space which should be located of main drive shift. So, the prerequisites for the trochoid radius ratio $R_r$ on the machine could not be 1 and 2, and only will be the integer $R_r \in \{3, 4, \ldots\}$.

Now let's take look the epitrochoid system, with reference to FIG. 2a. It can be seen this system has exactly the same kinematics features if it take the same setup as hypotrochoid system, which are:

$R_r = R/r$, and $R_r \in \{1, 2, \ldots\}$ (here the major difference between epitrochoid system and hypotrochoid system is $R_r$ starts from 1 or 3);     1)

$\alpha_i = (i-1)180°/R_r$, and $i \in \{1, 2, \ldots 2*R_r\}$;      2)

$\theta_i = \alpha_i + i*180°$, and $i \in \{1, 2, \ldots 2*R_r\}$.      3)

And also it will provide not only cases Rr≥3 but also cases Rr2 and Rr1, which means it would be able to develop engines as well as four pistons and two pistons (see FIG. 3a and FIG. 3c), which the hypotrochoid system cannot do.

FIG. 2b and FIG. 3b both show how to form a housing wheel engine based on epitrochoid system.

Take a crankshaft $C_s$, which's radius of the offset is ¼ length of a stroke, and mount this crankshaft $C_s$ on the center of a rolling gear $G_r$. When all of the rolling gears $G_r$ roll outside of a fixed annular gear $G_b$, the crankshaft $C_s$ (which joined inside of a slot $S_s$) will drive a piston $P_s$ moving total ½ length of the stroke around a center of rolling gear $O_r$. Any two of the neighborhoods of the pistons $P_s$ will be driven by the crankshafts $C_s$ and the rolling gear $G_r$, either depart till to a maximum combustion room MXR, which is whole length of the stroke or approaching till to a minimum combustion room MNR each other.

The same kinematics feature as hypotrochoid system, there are two movements in this system: (1) the reciprocating swing of the piston $P_s$ with respect to the center of the rolling gear $O_r$ and (2) the rotation moving of all pistons $P_s$ with respect to the center of the fixed annular gear $O_b$. These two kinds of movements represent respectively of (1) compressing/expanding motions between any two of neighborhoods of pistons $P_s$, and (2) four-stroke circulation around the center of the fixed annular gear $O_b$ (The mechanism of four-stroke circulation will not be discussed in this invention since it won't be changed).

2.2 the Issues of the Housing Wheel Seals:

Conceptually, Housing Wheel Seals (which is Ws in FIG. 4), which could be using in the machine based on the principle of hypotrochoid system, most look like thin, annular and the size as larger as housing wheel, located between two housing wheel halves (which are Hwh in FIG. 4). They must endure some particular harsh working environment, such as high friction, high temperature, high pressure and high velocity, and meanwhile they have to maintain high gas tightness. These housing wheel seals move with circumferential direction (Sd in FIG. 4), which doing like blade with cutting movement. It's a very tough touching to Housing Wheel Halves Hwh. Compare with regular piston rings, which move with axial direction, doing like blade with shaving movement. It's a kind of mild touching to the cylinder wall. It is obviously that the way of piston-ring should be adopted.

The instant invention proposed a new method that employs an "integral housing wheel" to substitute "a pair of housing wheel halves", in order to avoid the housing wheel seal Ws be using. Also discussed some derivative issues, which are (1) making pistons no longer mounted inside of housing wheel halves, and using piston-sets (see FIG. 6) that doing relative motion within integral housing wheel instead. (2) Separating intake and exhaust valves and relocated them outside of the pistons (see FIG. 7). (3) Using anti centrifugal system (see FIG. 9) to overcome centrifugal force on piston-set.

The benefits of above are (1) using piston-ring to replace housing wheel seal, (2) makes each of individual valve no longer to take both functions within exhausting and intake strokes, and preventing the risk of the same valve could be overheated within exhaust stroke and could untimely to igniting within intake stroke, and (3) conquered friction resistance between the piston-set and housing wall that generated by the centrifuge force on the piston-set.

Another issue is particularly for R1 case, since other than RII cases will have centrosymmetry automatically when in running. But a machine of two pistons will be non-centrosymmetry when it does compression in one side and expanding in another side. This behave make the machine shaking. The instant invention proposed a mechanism called a vibration balance system to counterbalance the shake (see FIG. 10).

SUMMARY OF THE INVENTION

It is a feature of the invention to provide a four-stroke Housing Wheel Engine.

It is another feature of the invention to provide a Housing Wheel Engine with the method of epitrochoid, which supports whole range of dimension in engine designing.

It is another feature of the invention to provide an epitrochoid gear sets formed therein by a fixed annular gear and plural pair sets of rolling gears. These rolling gears evenly interlocked each other and located outside of the fixed annular gear evenly.

It is another feature of the invention to provide an integral housing wheel formed therein by plurality of housing wheel segments, which connected together by crankshaft holders and intake-exhaust ports holders (simplified as an I-X holder).

It is another feature of the invention to provide a timing set formed therein by the epitrochoid gear set and plurality of the crankshafts, which's radius of the offset is ¼ of a stroke length. Each of the crankshafts connects to a piston-set with a rolling gear. A specific way to assemble epitrochoid gear set and crankshaft provides the kinematics features and timing features of four-stroke.

It is another feature of the invention to provide an anti centrifugal system which formed therein by a spherical thrust bearing, a pair of logarithmic spiral cam, a pair of gravity blocks, and a pair of lever, to balance the centrifugal force of the piston-sets.

It is another feature of the invention to provide a vibration balance system for only $R_r 1$ system. The vibration balance system has a pair of vibration balancers and each of the vibration balances formed therein by an offset pin on the rolling gear, a gravity slide block and a slide track to counterbalance the vibration, which caused by non-centrosymmetry of a case of $R_r 1$.

DETAILED DESCRIPTION OF THE INVENTION

Here in the detail discussing, $R_r 1$ as the only case be used, other $R_r > 1$ cases will be easier inferred.

Figure 5:
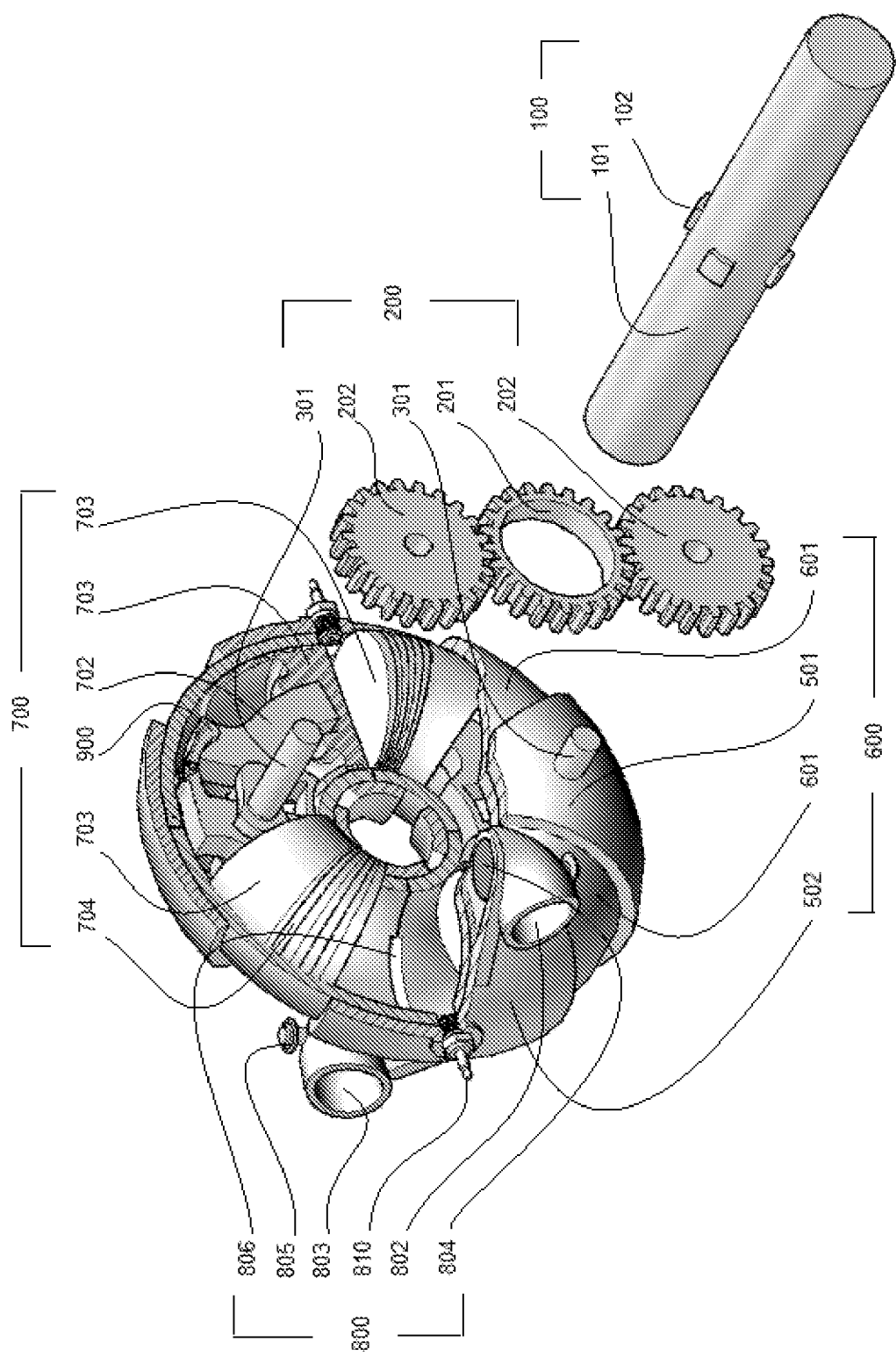
FIG. 5 is an exploded perspective view of the $R_r 1$ housing wheel engine.

With reference to FIG. 5, it can be seen that the housing wheel engine, which formed by an integral housing wheel 600, two of the piston-sets 700, an epitrochoid gear set 200, two of the I-X holder 800 and a main shaft 100 therein.

Continuing with reference to FIG. 5, it can be seen that an integral housing wheel 600 formed by four (its $4*R_r$ in general) housing wheel segments 601, and be connected together by two (its $2*R_r$ in general) crankshaft holders 501 and two (its $2*R_r$ in general) I-X holders 502. Two of crankshaft holders 501 and two of I-X holders 502 are located interlaced evenly and binding the housing wheel segments 601 tightly as hoops.

Figure 6:
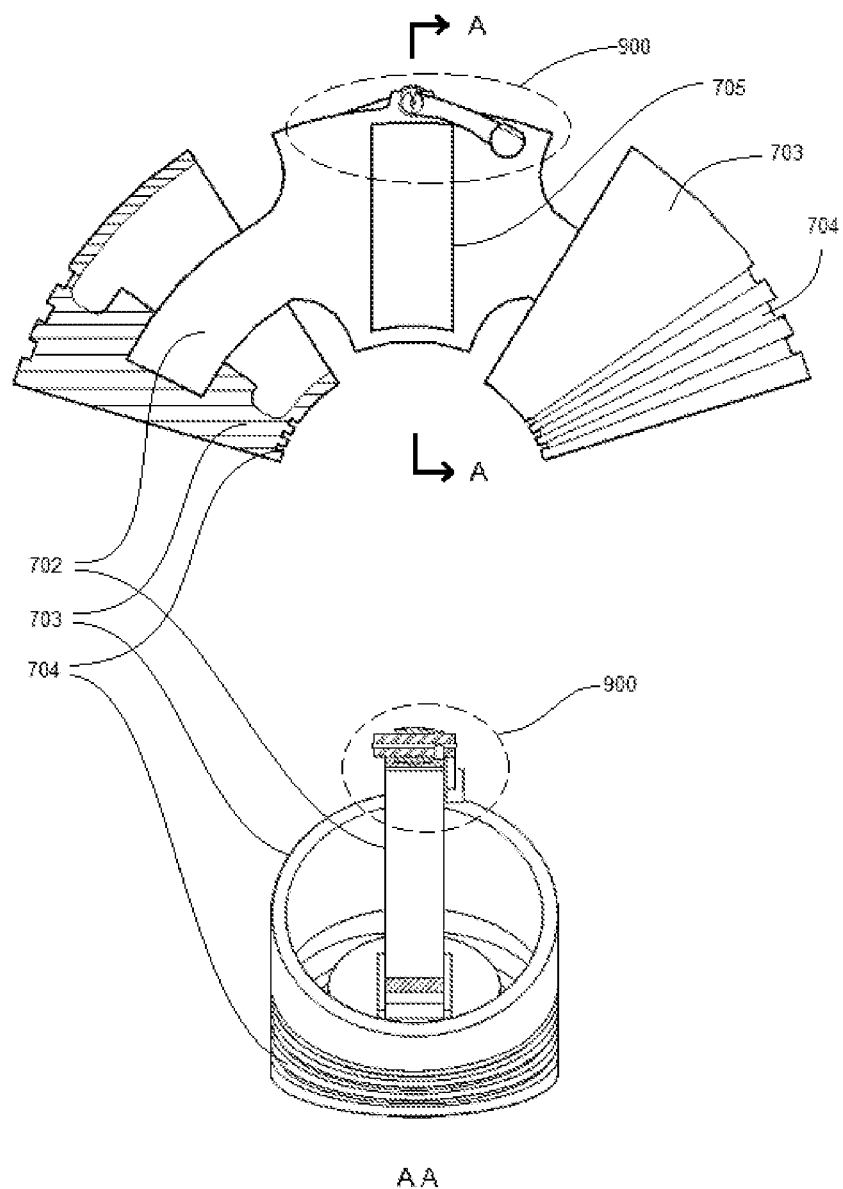
FIG. 6 is a three-view of the piston-set.
Figure 8:
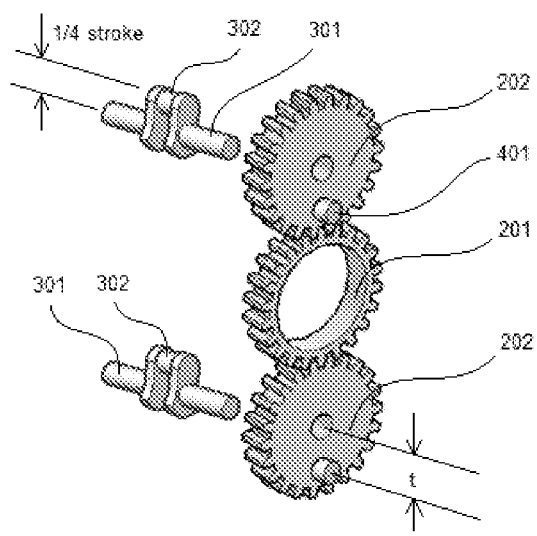
FIG. 8 is an exploded perspective view of the $R_r 1$'s epitrochoid gear sets.

Still with reference to FIG. 5, also FIG. 6 and FIG. 8, it can be seen that two (its $2*R_r$ in general) of the piston-sets 700 and each one formed by a pair of pistons 703, and be fixed on two ends of a slotted rod 702. Two of the piston-sets located inside of the integral housing wheel 600, and each one of piston-set connected with a rolling gears 202 by a crankshafts 301, which's offset part 302 be joined into a slot 705 of the slotted rod 702, respectively.

Figure 7:
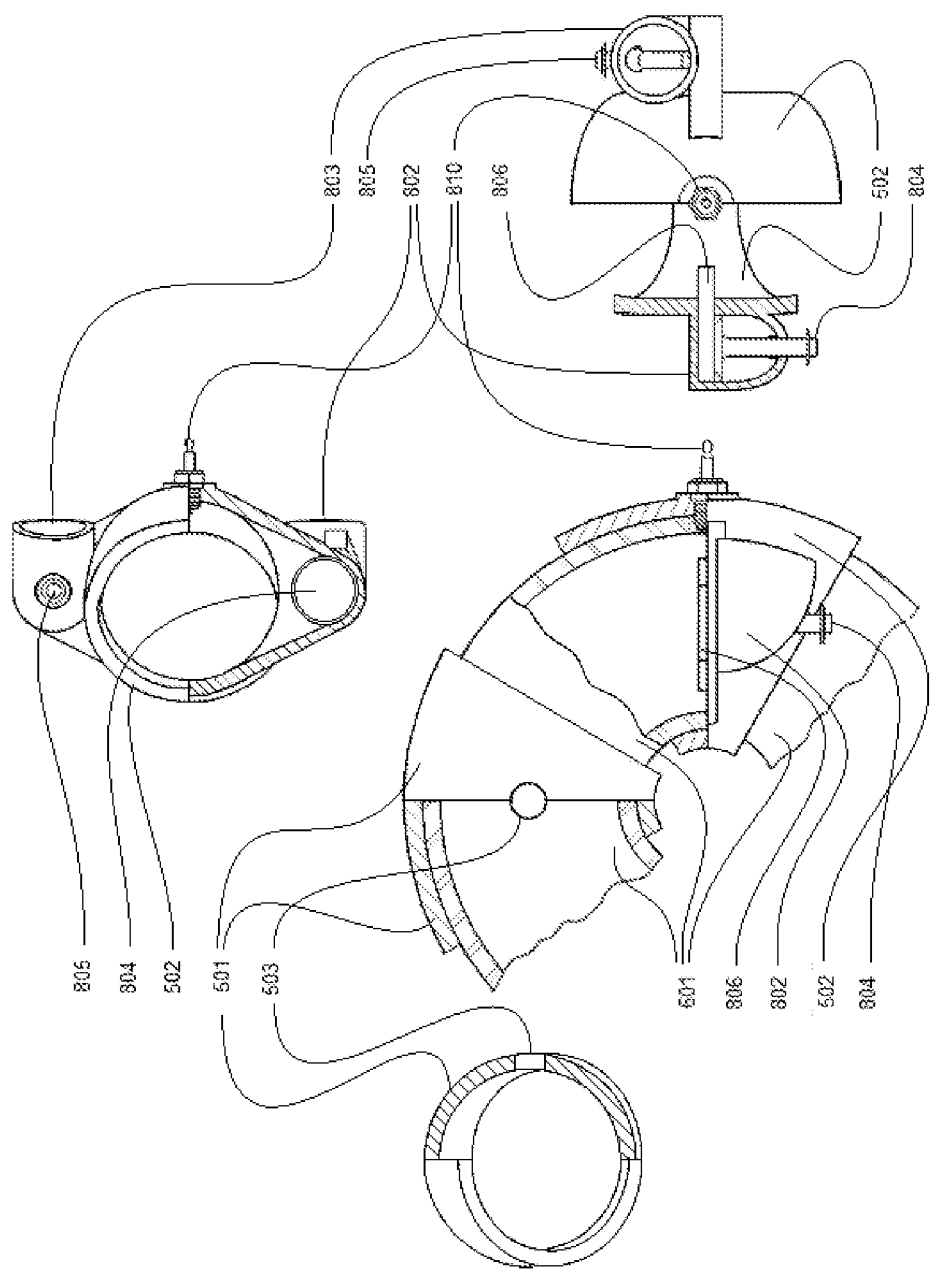
FIG. 7 is a three-view of the crankshaft holder and the I-X holder.

And still with reference to FIG. 5 and also FIG. 7, it can be seen that a intake valve 804 and an exhaust valve 805 located within an intake port 802 and an exhaust port 803 respectively, and two ports located at two sides of the I-X holder 502 (another I-X holder not showing in FIG. 5 because of the exploded perspective view, but its showing in FIG. 7). Both of the intake port 802, exhaust port 803 go through the intake valve 804, the exhaust valve 805 and a rectangle hole 806 into the integral housing wheel 600, and the size of the narrow side of the rectangle hole 806 limited by MNR. It also can be seen that there is a spark igniter 810 located between the intake port 802 and the exhaust port 803, in order to do its function properly.

And still with reference to FIG. 5 and also FIG. 8, it can be seen that an epitrochoid gear set 200 formed by a pair of (its $2*R_r$ in general) rolling gear 202 meshed with a fixed annular gear 201, and each of rolling gear 202 has a crankshaft 301 mounted on the center.

In order to ensure epitrochoid gear set 200 carries out a proper work to the engine, its need to be having an initial assembling correctly. Based on the previous discussion, we already knew that the preset up is necessary for sure the epitrochoid engine can be timely correct for four-strock, the essential setups are:

$\alpha_i = (i-1)180°/R_r$, and $i \in \{1, 2, \ldots 2*R_r\}$;

$\theta_i = \alpha_i + i*180°$, and $i \in \{1, 2, \ldots 2*R_r\}$.

Based on these setup, the initial assembling must be both of the offset part 302 of the crankshafts lined up with three centers of the gear set and in the same direction (see FIG. 8) (the offset pin 402 and offset t in FIG. 8 will be discuss later at paragraph of a Vibration Balance System).

Since an axle part 301 of the crankshafts located inside of a crankshaft bearing seat 503 (see FIG. 7) and fixed on the rolling gear 202, also the offset part 302 of the crankshafts located inside of the slot 705 (see FIG. 6) respectively. The rolling gears 202 roll around the fixed annular gear 201 will drive the integral housing wheel 600 (see FIG. 5) rotating around the center of the fixed annular gear 201, and the piston-sets 700 (see FIG. 5) swing around the center of the rolling gears 202.

Figure 1A:
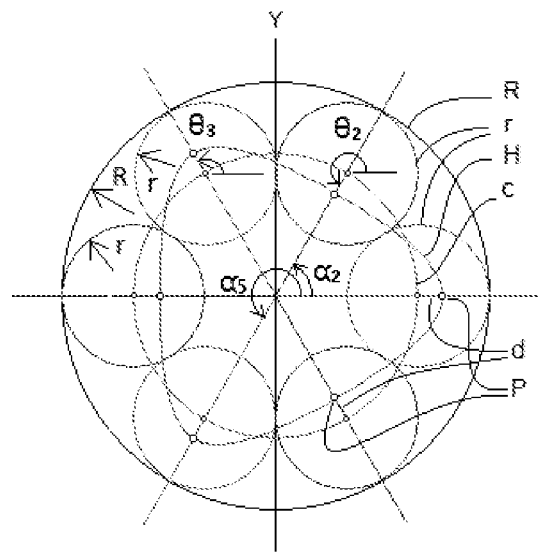
FIG. 1 a-b are schematic views of hypotrochoid system.
Figure 1B:
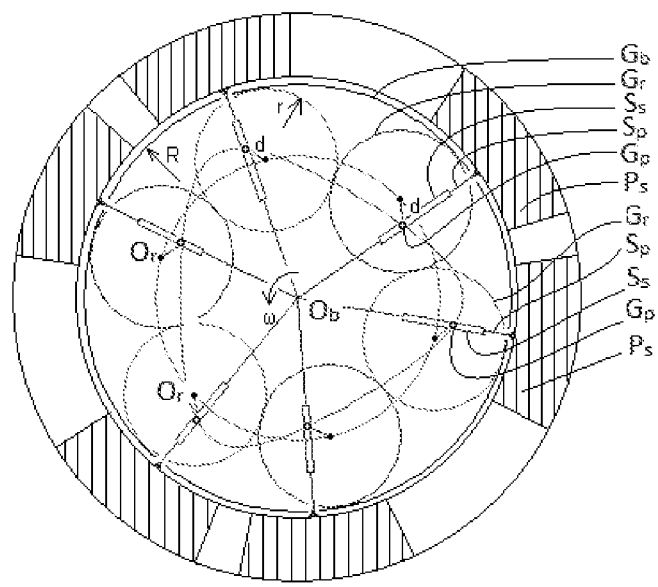
Figure 2:
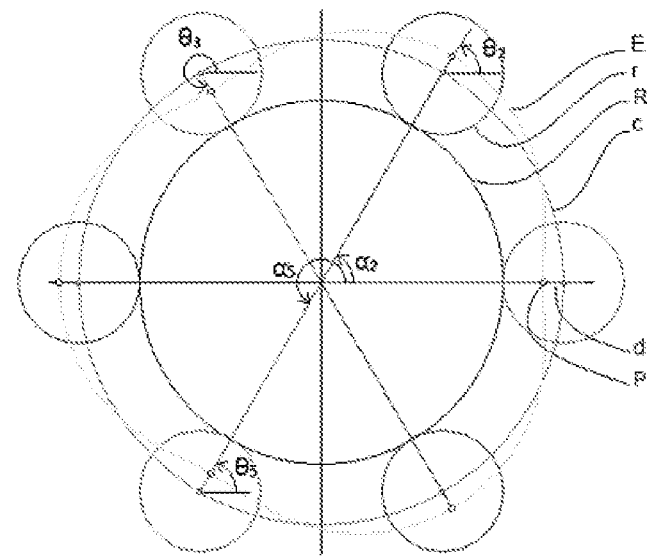
FIG. 2 a-b are schematic views of epitrochoid system.
Figure 2:
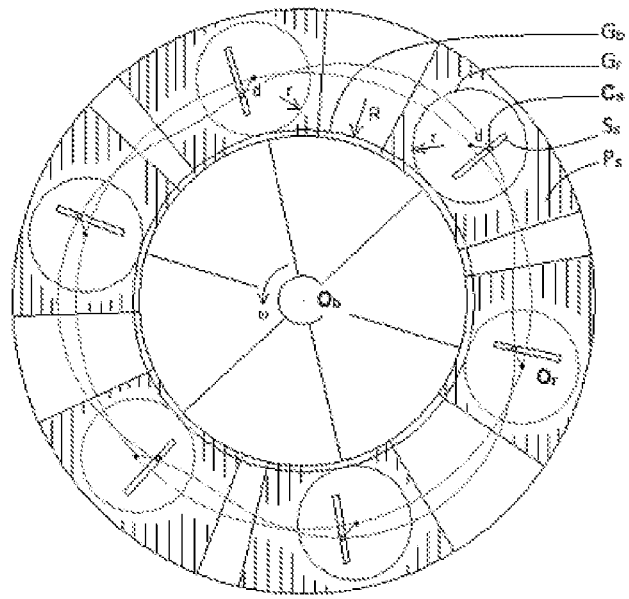
Figure 3A:
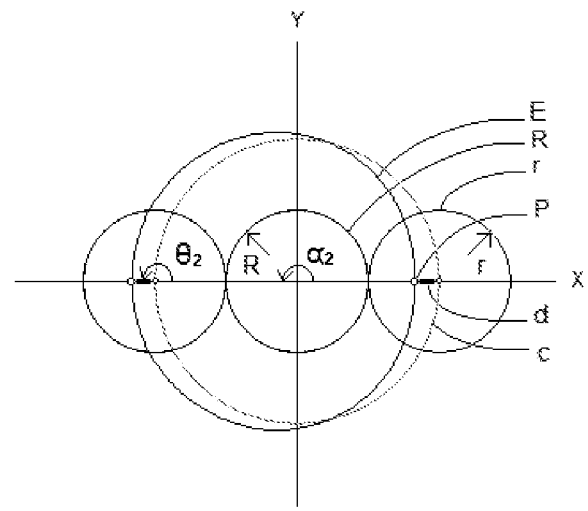
FIG. 3 a-b-c are schematic views of epitrochoid system $R_r 1$ and $R_r 2$.
Figure 3B:
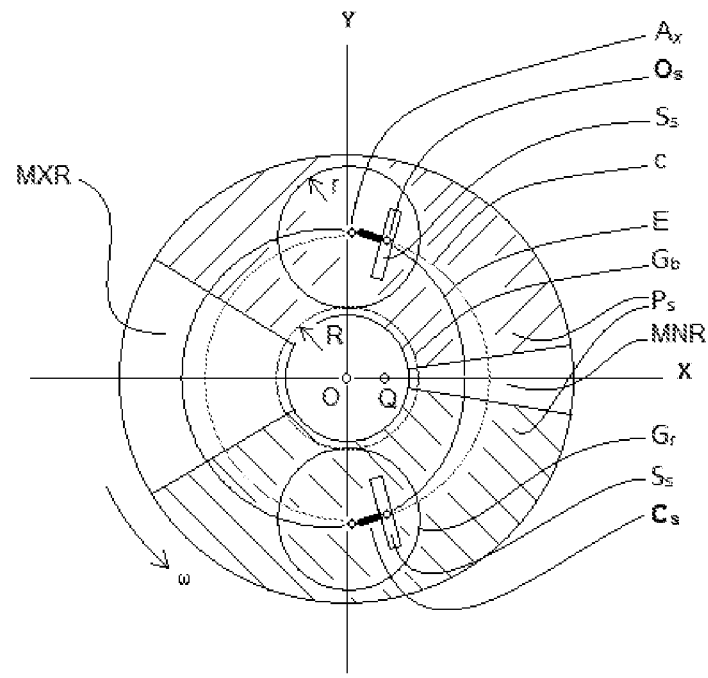
Figure 3C:
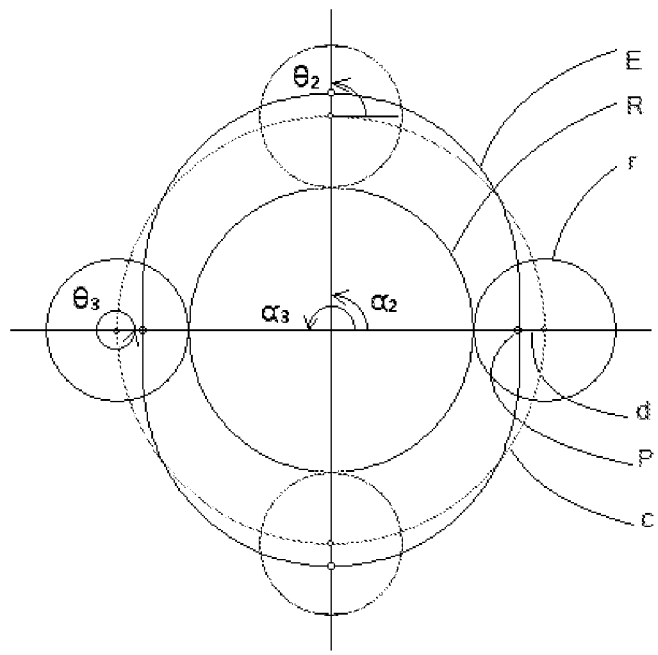
Figure 4:
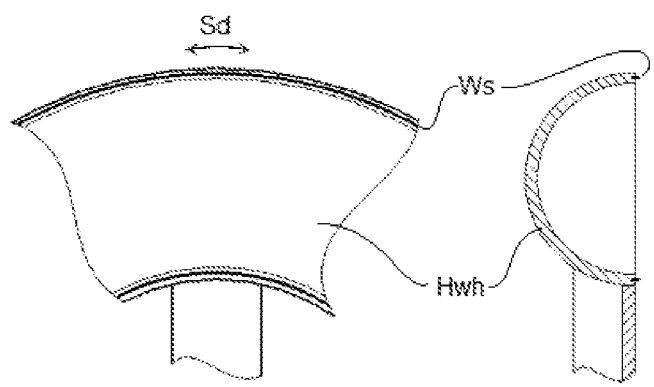
FIG. 4 is a schematic view of the seal of hypotrochiod system.

With reference to FIG. 3a and FIG. 3b, it can be seen that there are two orbits revolved by two parts of crankshafts when they are running, one is an epitrochoid curve E which revolved by the offset part $O_s$ of the crankshaft, and another is a circle c which revolved by the axle part $A_x$ of the crankshaft. And also it can be seen that there are two (its $2R_r$ in general) intersections I on both orbits c and E. When epitrochoid gear set is running, the two offsets $O_s$ will be run always on opposite sides of the circle c except when both $O_s$ on intersections I simultaneously. It will drive the two pistons $P_s$ either closer or apart each other and the minimum combustion room MNR and the maxmum combustion room MXR will be reached, when both $O_s$ arrival to I. Then the space of MNR will be expanded till to MXR, and the space MXR will be shrunk till to MNR when both $O_s$ arrival to next I again. This cycle makes only two strokes happen, it needs epitrochoid gear set run two cycles to finish four strokes.

Since the space of MXR is a whole of a stroke, which formed by two neighbored pistons depart each other to the end, so the maximum moving of each piston will be ½ of a strokes length, and the offset $O_s$ of the crank will be ¼ of a stroke length.

Figure 10:
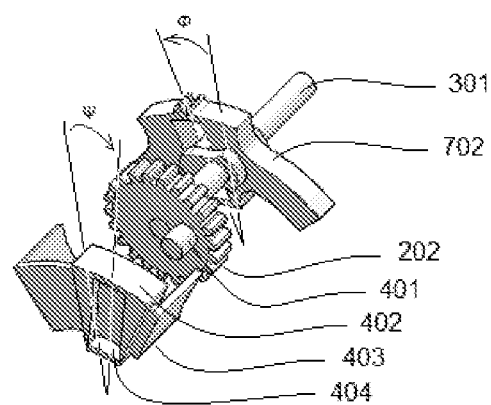
FIG. 10 is an exploded perspective view of the vibration balance system.
Figure 9:
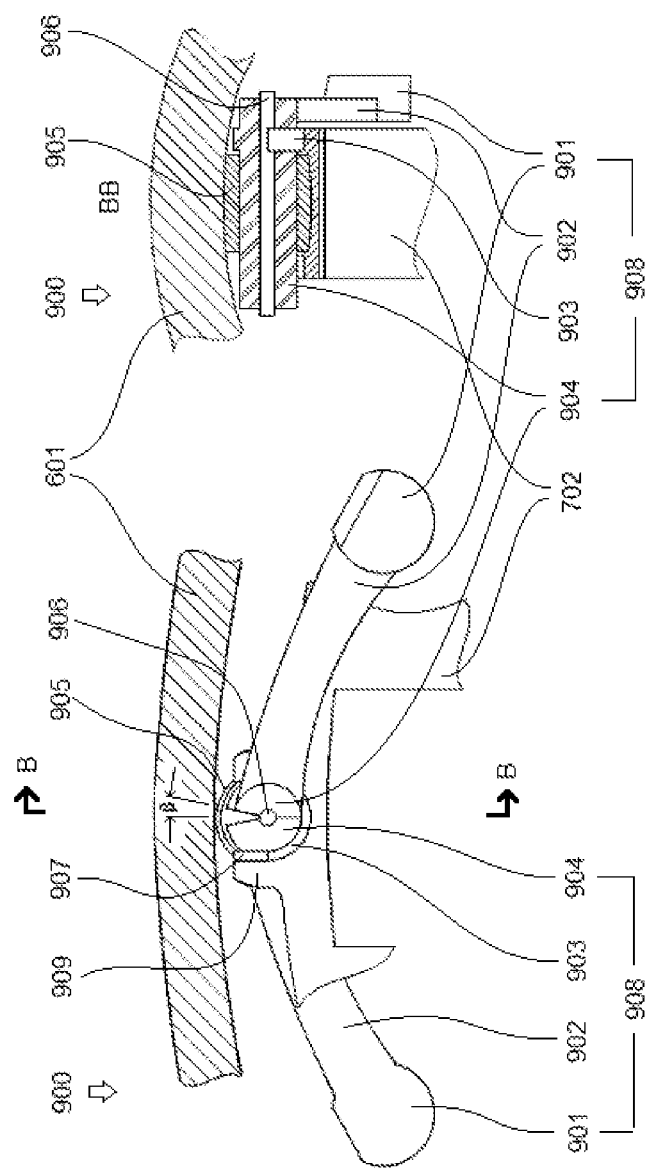
FIG. 9 is a three-view of the anti centrifugal system.

Still with reference to FIG. 9, FIG. 10 and also FIG. 5, FIG. 6. It can be seen that there is an anti centrifugal system 900 (FIG. 6), and it include an anti-centrifugal base and an anti-centrifugal assembly, and located between a piston-set 700 and a wall of combustion chamber 601 (FIG. 5, FIG. 6 and FIG. 9). When engine is running, the centrifugal force will push piston-set 700 to the wall of combustion chamber 601. It generated a resistance between the piston-set 700 and the wall of combustion chamber 601. The faster rotating of the engine, the greater resistance will be. In order to counteract this resistance the anti centrifugal system is necessary.

There is an anti-centrifugal base 909 located on the top of the slotted rod 702 to hold the anti-centrifugal assembly 900, which comprised by a pair of spiral cam axle half 908, a spherical thrust bearing 905 therein. A spiral cam axle half 908 further formed by a gravity block 901, a gravity block level 902, a spiral cam 903 that has a curve of logarithmic spiral, and an axle half 904 therein. The running engine generates a centrifugal force on the gravity block 901 that makes a certain torque to the spiral cam 903 go through the gravity block level 902. Since the spiral cam 903 fixed on the axle halves 904, which fits inside of a spherical thrust bearing 905 that is against the wall of combustion chamber 601. So the spiral cam 903 will push the slotted rod 702 down by going through a cam follower 907 to balance the centrifugal force of the piston-set 700. Here the curve of the cam follower 907 will be the same logarithmic spiral as the spiral cam 903 but its polar radius is greater than the one that the spiral cam 903 has. A core of axle 906 located in the central of two of axle halves 904 to make sure no any of up-down movement on both of cam axle halves.

There is a small angle β on up side of the axle halves 904 (see β in FIG. 9) to have enough space to avoid against each other between both of the axle halves 904.

Still with reference to FIG. 3b, FIG. 8 and FIG. 10, it can be seen that a gravity center of the piston-sets Q does not coincide with an engine center O in most of running time, this is because of the two piston-sets moving into the same side of the engine to cause this non-centrosymmetry (FIG. 3b). This non-centrosymmetriccase only exist in $R_r1$ since of the other cases are centrosymmetric to the engine center. In order to avoid the vibration caused by this case, the vibration balance system is necessary for $R_r1$ engine. A pair of vibration balancers, and each formed by an offset pin 401, a gravity slide block 402 and a slide track 403 therein (FIG. 10). The offset pin 401 located on a rolling gear 202 in reverse t distance with the offset part of the crankshafts 302 (FIG. 8), and it will be jointed inside of a slot 404 in order to move the gravity slide block 402 along the slide track 403, which is fixed outside of the crankshaft holder 501. Therefore the gravity slide block 402 runs in opposite way with the piston-set 700 always. If the t=¼ stroke length and the weight of the gravity slide block is the same as the weight of the piston-set, then the Q will be coincide with the O in all the running time. If the t #% stroke length, the longer t is, the less weight of gravity slide block will be.

What is claimed is:

1. A housing wheel engine comprising:
an epitrochoid gear set, said epitrochoid gear set further comprising a fixed annular gear having a radius (R) and a plurality of pairs of rolling outer gears ($R_r$), said rolling outer gears being spaced evenly about a perimeter of said fixed annular gear, each respective gear of said plurality of pairs of outer rolling gears having a radius (r), whereby $R_r$ is a positive integer, said fixed annular gear and said rolling gears having a pitch ratio defined by R/r, each respective gear of said plurality of pairs of outer rolling gears being engaged with said fixed annular gear and another respective one of said outer rolling gears; and
an integral housing wheel having a plurality of crankshaft holders and crankshafts each equaling 2*$R_r$, each of said crankshaft holders having a pair of crankshaft bearing seats and said crankshaft holders receiving a respective axle portion of a respective said crankshaft;
a plurality of I_X holders equaling 2*$R_r$, each of said I_X holders having a pair of intake-exhaust ports and a spark igniter;
a plurality of arc-shaped housing wheel segments equaling 4*$R_r$, each of said housing wheel segments having a pair of rectangular through holes configured for flowing gas through respective said arc-shaped housing wheel segments;
wherein each of said crankshaft holders being connected to a respective one of said I_X holders and binding respective said arc-shaped housing wheel segments to form a complete wheel;
a timing set, wherein said timing set comprises a plurality of piston-sets equaling 2*$R_r$, said plurality of crankshaft holders, said plurality of crankshafts and said epitrochoid gear set; and further wherein each of said piston-sets being located inside of said housing wheel;
respective ones of each of said piston-sets being connected to respective said rolling gears by respective said crankshafts; and a cylindrical driveshaft, said cylindrical driveshaft having a plurality of coupling keys being located at a center of, and engaged together with said housing wheel by said plurality of coupling keys.

* * * * *